United States Patent [19]

Ahne et al.

[11] Patent Number: 4,514,043
[45] Date of Patent: Apr. 30, 1985

[54] METHOD FOR THE PREPARATION OF ORIENTATION LAYERS FOR LIQUID CRYSTAL DISPLAYS AND LIQUID CRYSTAL DISPLAYS HAVING ORIENTATION LAYERS

[75] Inventors: Hellmut Ahne, Röttenbach; Hans Krüger, Munich; Roland Rubner, Röttenbach, all of Fed. Rep. of Germany

[73] Assignee: Siemens Aktiengesellschaft, Berlin and Munich, Fed. Rep. of Germany

[21] Appl. No.: 350,826

[22] Filed: Feb. 22, 1982

[30] Foreign Application Priority Data

Feb. 27, 1981 [DE] Fed. Rep. of Germany ....... 3107520

[51] Int. Cl.³ .............................. G02F 1/13
[52] U.S. Cl. .................................. 350/341
[58] Field of Search ............ 350/341; 427/385.5, 427/389.7

[56] References Cited

U.S. PATENT DOCUMENTS

| | | | |
|---|---|---|---|
| 3,967,882 | 7/1976 | Kubota et al. | 350/341 |
| 3,994,567 | 11/1976 | Matsuo et al. | 350/341 |
| 4,002,404 | 1/1977 | Dir | 350/341 X |
| 4,068,923 | 1/1978 | Toida . | |
| 4,252,414 | 2/1981 | Kinugawa et al. | 350/341 X |
| 4,273,420 | 6/1981 | Watanabe et al. | 350/341 |
| 4,278,326 | 7/1981 | Kawamura et al. | 350/341 X |
| 4,311,785 | 1/1982 | Ahne et al. | 430/287 X |
| 4,366,230 | 12/1982 | Ahne et al. | 430/280 X |

FOREIGN PATENT DOCUMENTS

| | | | |
|---|---|---|---|
| 30859 | 8/1977 | Japan | 350/341 |
| 136353 | 10/1979 | Japan | 350/341 |
| 136354 | 10/1979 | Japan | 350/341 |
| 136352 | 10/1979 | Japan | 350/341 |
| 156916 | 12/1980 | Japan | 350/341 |
| 1372868 | 11/1974 | United Kingdom . | |

*Primary Examiner*—John K. Corbin
*Assistant Examiner*—Richard F. Gallivan
*Attorney, Agent, or Firm*—Kenyon & Kenyon

[57] ABSTRACT

The invention relates to a method for the preparation of orientation layers for liquid crystal displays wherein a solution of an organic prepolymer is applied to a transparent substrate, and the prepolymer is then annealed to result in the desired polymer, which is then subjected to an orientation treatment, and has the objective to develop a method of this type in such a manner that it is possible to prepare orientation layers which can be highly stressed thermally and are dimensionally stable, i.e., are not subject to changes of morphological structure even at temperatures of $\geq 420°$ C. For this purpose, the invention employs prepolymers of polyquinazoline diones or polyisoindoloquinazoline diones. The method according to the invention is suited in particular for the preparation of orientation layers for glass solder, liquid crystal displays.

7 Claims, 1 Drawing Figure

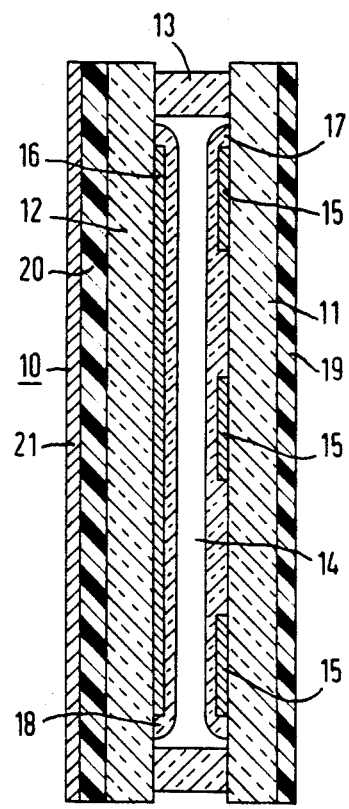

METHOD FOR THE PREPARATION OF ORIENTATION LAYERS FOR LIQUID CRYSTAL DISPLAYS AND LIQUID CRYSTAL DISPLAYS HAVING ORIENTATION LAYERS

BACKGROUND OF THE INVENTION

The present invention relates to a method for the preparation of orientation layers for liquid crystal displays wherein a solution of an organic prepolymer is applied to a transparent substrate and subsequently annealed and subjected to an orientation treatment, and further relates to liquid crystal displays having an orientation layer made by this method.

In liquid crystal displays (LCD), uniform orientation of the liquid crystals is required. Accordingly, so-called "orientation layers" are applied to the electrodes. The preparation of the orientation layers can be accomplished, for example, by an oblique vapor deposition of $SiO_x$. This process, however, is elaborate and relatively expensive. It has, therefore, been attempted to employ orientation layers made from organic materials.

A good seal is required in liquid crystal displays to ensure operating reliability and, thus, particularly in high quality displays, sealing with glass solder (a low-melting glass) is employed instead of cementing. As a consequence, the orientation layers used in glass-solder liquid crystal displays must be able to withstand temperatures up to 400° C. and more without change in their morphological structure.

Organic orientation layers for liquid crystal indicators or displays consist, for example, of polyvinyl alcohol. However, such layers have only very limited dimensional heat stability. For increased thermal requirements, therefore, orientation layers made of polyimides are used. The orientation layers of polyimide are prepared in a manner such that a polyamido carboxylic acid (a prepolymer of polyimides) is dissolved in a solvent and is applied as a film to the electrode layer or electrode base plate. After the application, the film coat is heated to elevated temperatures, i.e., annealed, whereby the polyimide is formed from the polyamido carboxylic acid. This is then followed by the orientation treatment of the polyimide resin film (see in this connection U.S. Pat. No. 4,068,923).

Polyimide can be used only in small layer thicknesses, however, due to its intrinsic coloring. Since orientation layers with a polyimide base also exhibit insufficient dimensional heat stability at temperatures above 420° C., they are poorly suited for high-quality liquid crystal displays fused with glass solder because the structure of the polyimide layers and, thus, the orientation of the liquid crystals in the display, is lost when the glass solder is fused.

SUMMARY OF THE INVENTION

It is an object of the present invention to provide a method of the type mentioned at the outset in such a manner that it is possible to manufacture orientation layers for liquid crystal displays which can thermally be highly stressed and are dimensionally stable, i.e., are not subject to changes of the morphological structure, even at temperatures of $\geq 420°$ C.

According to the present invention, this and other objects are achieved by using prepolymers of polyquinazoline diones or polyisoindoloquinazoline diones.

Prepolymers of the type mentioned exhibit high thermal stability (up to 500° C.). In addition to their high transparency and their low intrinsic coloring, which change only little under high thermal stresses, the orientation layers prepared in accordance with the method of the present invention are distinguished by their high thermal stability (dimensional heat stability) which, surprisingly, does not lead to changes of even the finest morphological structures even at temperatures of $\geq 420°$ C. Orientation layers in the form of so-called rubbed layers can, therefore, be prepared by the method according to the present invention, and the expensive oblique vapor deposition can be dispensed with also in the manufacture of high quality glass-solder liquid crystal displays in favor of the more cost-effective rubbing technique. In addition, the high transparency and the low intrinsic coloring of the orientation layers produced by the method according to the present invention permits the use of greater layer thicknesses, so that these layers can assume an additional protection or improvement function.

The prepolymers used in the method according to the present invention generally have the following structure:

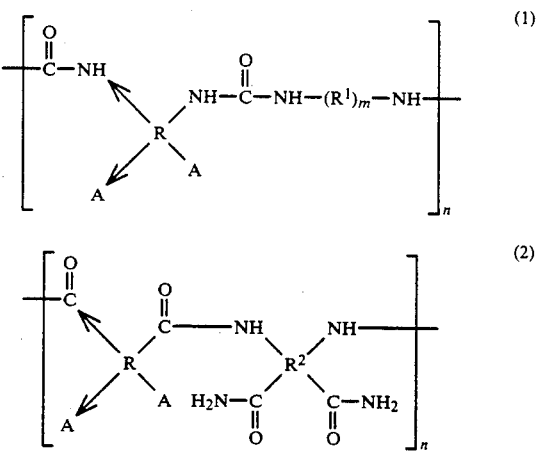

The arrows contained in each formula express the fact that the position of the two substituents at R can be interchanged. This is important because R is a cyclic radical, as is explained hereinafter.

In the formulae, of which formula (1) shows polyquinazoline dione and formula (2) shows polyisoindoloquinazoline dione prepolymers, n always means an integral number from 2 to about 100; m is 0 or 1.

For the radicals R, $R^1$, $R^2$ and A, the following applies:

R is an at least partially aromatic and/or heterocyclic tetravalent, i.e., tetrafunctional, radical, optionally halogenated, in which two valences each are arranged in a mutually adjacent position; if the radical R has several aromatic and/or heterocyclic structure elements, the valence pairs are at such structure elements in end position;

$R^1$ is a divalent, i.e., difunctional, radical, optionally halogenated, of aliphatic and/or cycloaliphatic structure, optionally having heteroatoms, and/or aromatic and/or heterocyclic structure:

$R^2$ is an at least partially aromatic tetravalent, i.e., tetrafunctional, radical in which at least two respective valences are arranged in mutually adjacent position, one of which carries a —CO—NH₂ group; if the radical R² has several aromatic structure elements, the valence pairs each are located at such structure elements in end position;

A means

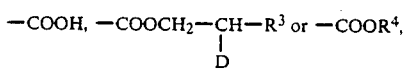

where R³ is an olefinically unsaturated radical, particularly an optionally substituted (meth)acrylester-containing group, R⁴ is an aliphatic, cycloaliphatic, heterocyclic or aromatic radical, and D is defined as follows:

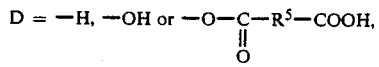

with R⁵ being an olefinically unsaturated, aromatic, aliphatic or cycloaliphatic radical.

The radicals R, R¹, R², R³, R⁴ and R⁵ have in particular the following meaning:

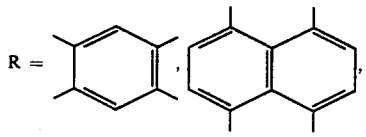

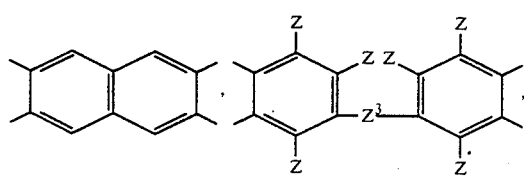

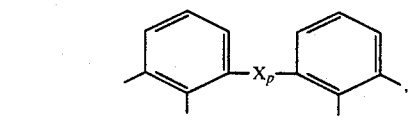

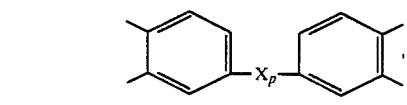

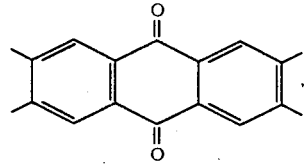

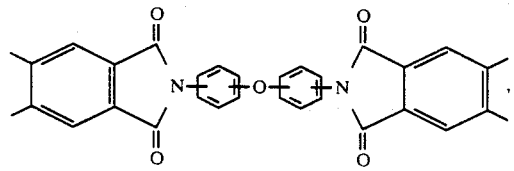

-continued

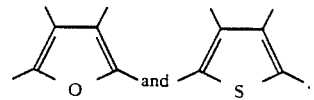

where p=0 or 1 and X stands for one of the following radicals:

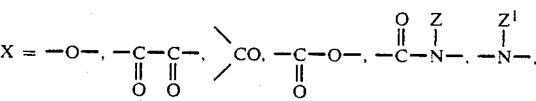

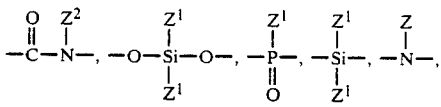

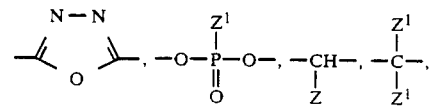

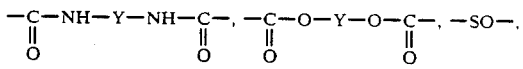

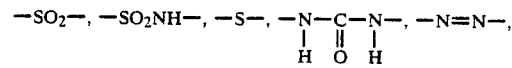

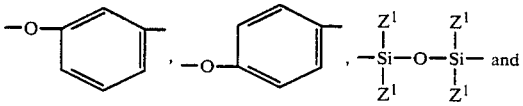

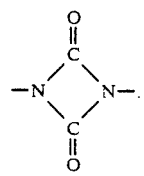

For the further radicals, the following applies:

Y = [structure with Z substituents], —(CH₂)ₒ— with o = 2 to 10, and

[structure] with p = 0 or 1;

Z = H or alkyl with 1 to 6 carbon atoms;
Z¹ = alkyl with 1 to 10 carbon atoms or aryl;
Z² = aryl or heteroaryl;

Z³ = [structure] or [structure]; and

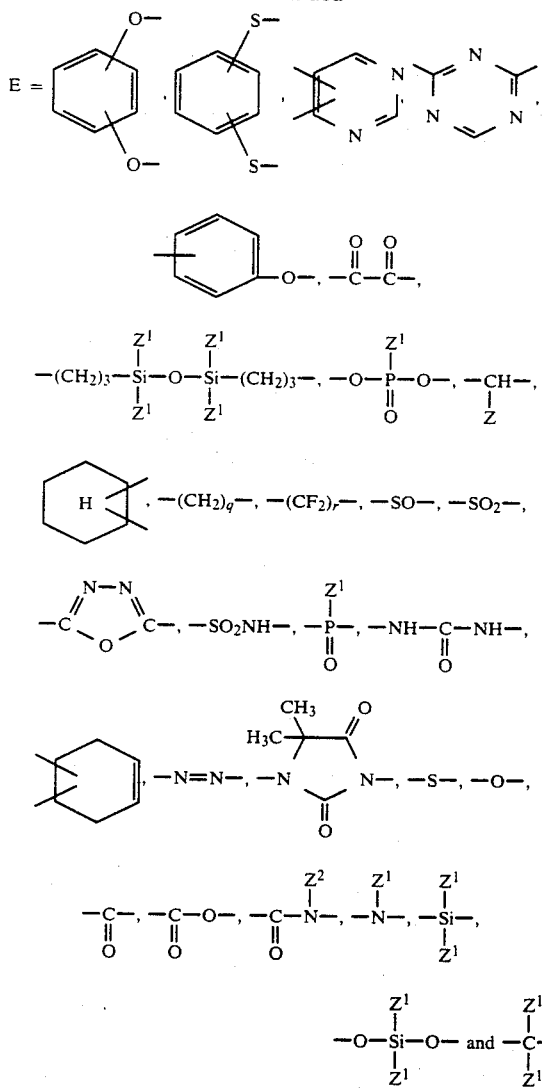
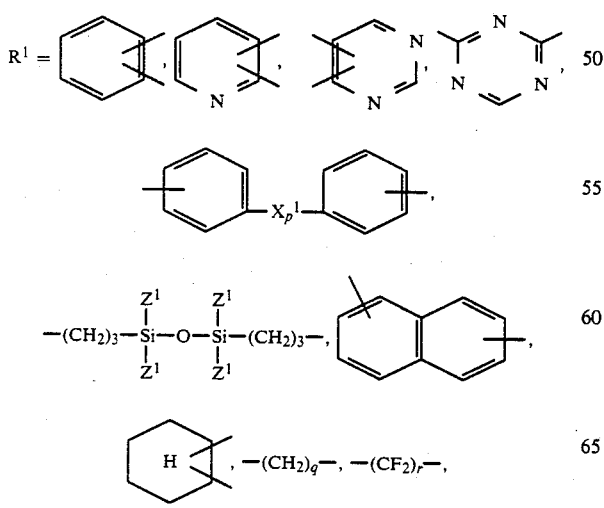
where q=2 to 14 and r=2 to 18, and Z, $Z^1$ and $Z^2$ are defined as above.
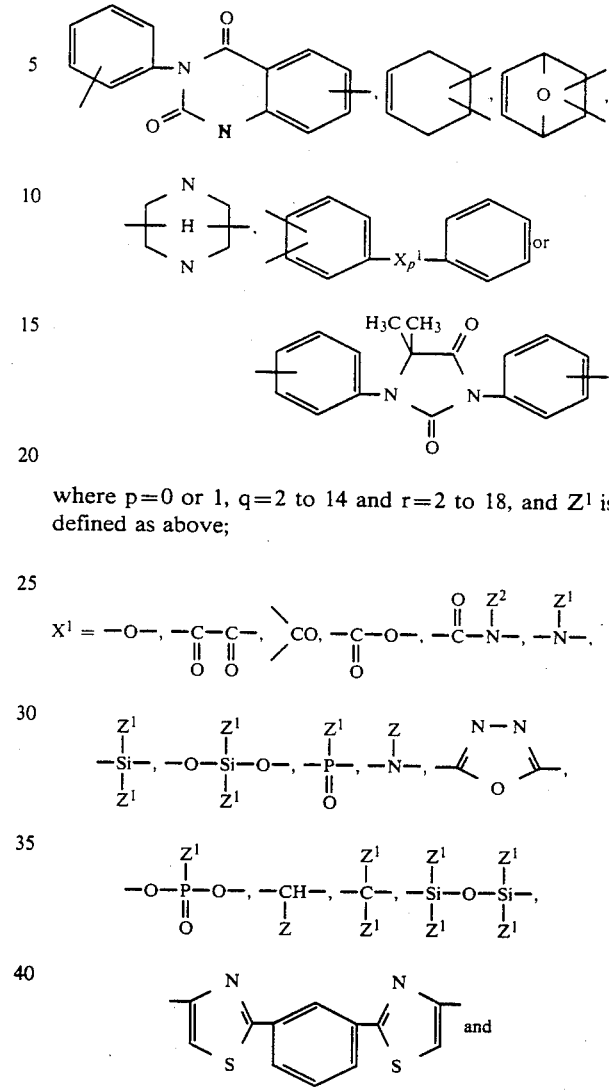
where p=0 or 1, q=2 to 14 and r=2 to 18, and $Z^1$ is defined as above;
where Z, $Z^1$ and $Z^2$ are defined as above.
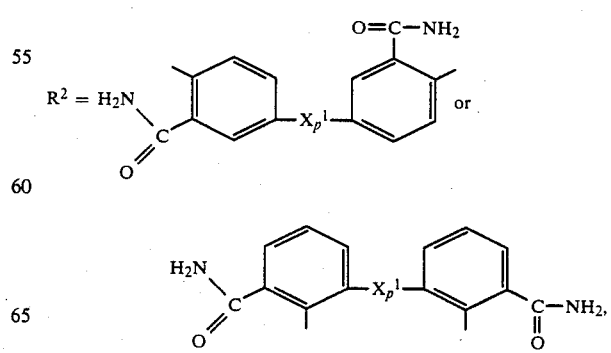
where p=0 or 1, and $X^1$ is defined as above.

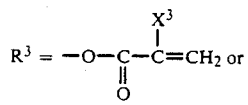

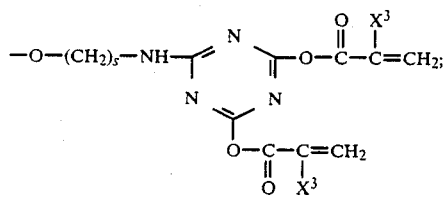

where s=2 to 16 and for $X^3$ the following applies:
$X^3 =$ —H, —CH$_3$, —Cl, —Br or —C≡N.

$R^4 =$ —CH$_3$, —(CH$_2$)$_t$—CH$_3$, —CH$_2$—CH=CH$_2$,

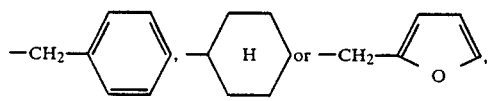

where t=1 to 17.

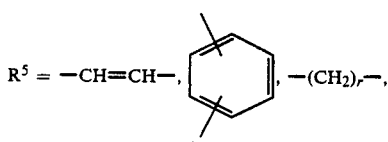

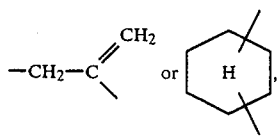

where r=2 to 18.

Compounds of the above-mentioned type are described, for example, in German Offenlegungsschrift No. 29 33 826. In the case of polyisoindoloquinazoline dione prepolymers, these are addition products of olefinically unsaturated monoepoxides and carboxyl group-containing polyaddition products of aromatic and/or heterocyclic tetracarboxylic acid dianhydrides and diamino compounds with at least one ortho-position amido group; the polyquinazoline dione prepolymers are addition products of olefinically unsaturated monoepoxides and carboxyl group-containing polyaddition products of aromatic and/or heterocyclic diaminodicarboxylic acids and diisocyanates.

Liquid crystal displays according to the present invention are characterized by the feature that they have orientation layers of polyquinazoline dione or polyisoindoloquinazoline dione. The orientation layers are prepared from suitable polymer precursor stages, so-called prepolymers. The polymer layers, which are oriented in a definite direction, are disposed on the electrodes or electrode layers and may in part cover also the electrode base plates (carrier plates).

It is of advantage if polymers are used in the method according to the present invention which give off a large percentage of volatile products during the annealing, since in this manner a reduction of the layer thickness can be achieved, specifically up to 40% and more, such that very thin layers can be produced. Although layer thicknesses as small as ≦0.02 μm are obtained, the layers still exhibit a homogeneous character.

To reduce the layer thickness, monomers, oligomers and/or polymers which are volatilized, at least in part, at temperatures in the annealing process of ≧250° C., can further be added to the prepolymer solution. Suitable additives are, for example, diazoquinones (o-quinone and o-naphthoquinone diazides), oligomeric esters and ethers with aliphatic or cycloaliphatic structure elements, and polymeric compounds such as polymethylmethacrylate and polyolefin sulfones.

DETAILED DESCRIPTION OF THE INVENTION

The invention will be explained in greater detail with the aid of the following illustrative examples and the appended FIGURE, in which FIGURE an embodiment of a liquid crystal display according to the present invention is shown.

EXAMPLE 1

Orientation Layers of Polyisoindoloquinazoline Dione

To prepare a polyisoindoloquinazoline dione prepolymer, 10.8 parts by weight 4,4'-diaminodiphenyl-3,3'-dicarboxylic acid amide are made into a slurry in 120 parts by volume dimethylacetamide and reacted drop-wise, while cooling with ice and stirring, with a solution of 14.5 parts by weight pyromellithic acid-diallyl ester bis-acid chloride in 25 parts by volume dioxane. The mixture is left standing overnight and is subsequently heated for one hour to about 60° C. The solution then is added drop-wise to 200 parts by volume water and the prepolymer produced in the form of a resin is washed with water and acetone and dried.

The pyromellithic acid-diallylester bis-acid chloride is, incidentally, prepared in the following manner: 87.2 parts by weight pyromellithic-acid dianhydride are shaken with 400 parts by volume allyl alcohol for 26 hours at room temperature in the presence of 0.4 parts by weight p,p'-bis(dimethylamino)diphenyl methane, and subsequently the excess allyl alcohol is distilled-off in a water-jet vacuum. The residue, pyromellitic-acid diallyl ester, is then left standing with 200 parts by weight thionyl chloride and 5 parts by volume dimethylformamide for 1 hour at room temperature, and is subsequently heated for 3 hours with a reflux cooler. Finally, the excess thionyl chloride is distilled off in a water-jet vacuum, the pyromellithic-acid diallylester bis-acid chloride remaining as the residue.

With a 9-% solution of the polyisoindoloquinazoline dione prepolymer obtained in the above-described manner in N-methylpyrrolidone, which solution also contains, as an adhesion agent, 1% (referred to the solid resin) of a silane such as γ-methacryloxypropyltrimethoxy silane, the support plates provided with the electrodes are coated by the so-called roller coating method; the outer zones, to which the cemented frame or the glass solder seal later is applied, can be kept free by structured rollers or templates. The prepolymer solution can be applied to the electrodes by brushing, immersion or spraying. After the coating, the film coat is dried for 1 hour at about 90° C. and the layer obtained (layer thickness: 0.09 μm) is subsequently annealed at about 280° C. for one hour and about 400° C. for one hour. By rubbing with a brush, grooves required for the orientation of the liquid crystals are then generated in the surface of the polyisoindoloquinazoline dione layer. The orientation treatment also can be preformed, for example, with a cloth, but the rubbing always is done in the same direction.

The orientation layers prepared in this manner bring about good orientation, i.e., uniform alignment, of the liquid crystals in the displays fabricated with the cementing technique. The good orientation properties are preserved even in displays fabricated by the glass solder technique, where two carrier plates each are joined together at the edge by means of glass solder at temperatures of about 450° C. In contrast thereto, control tests have shown that with polyimide orientation layers, the orientation properties are lost after heating to 450° C.

EXAMPLE 2

Orientation Layers of Polyquinazoline Dione

For preparing a polyquinazoline dione prepolymer, 5.6 parts by weight 4,4'-diaminodiphenylmethane-3,3'-dicarboxylic acid diallyl ester are dissolved in 30 parts by volume N-methylpyrrolidone and reacted with 1 part by weight triethylamine. To the so-obtained mixture are added, while cooling with ice and stirring, 3.8 parts by weight 4,4'-diphenylmethanediisocyanate in 10 parts by volume N-methylpyrrolidone, and stirring is continued at room temperature overnight. The solution is then added drop-wise to 700 parts by volume isopropanol and the precipitated prepolymer is dried.

The 4,4'-diaminodiphenylmethane-3,3'-dicarboxylic acid diallyl ester is prepared as follows: 177 parts by weight anthranilic acid allyl ester which is prepared by reaction of isatinic acid anhydride with allyl alcohol, are dissoved in 350 parts by volume ethanol and reacted drop-wise with 85 parts by volume of 35-% aqueous formaldehyde solution. Heat is then applied for 30 minutes at about 60° C. In the subsequent cooling with ice, methylene dianthranilic acid allyl ester is precipitated in crystalline form. 45.2 parts by weight of the methylene dianthranilic acid allyl ester are dissolved in 90 parts by volume dioxane and are reacted at 50° C. drop-wise, while stirring, with concentrated HCl. Stirring is continued for another 3 hours at about 50° C. Upon cooling, the 4,4'-diaminodiphenylmethane-3,3'-dicarboxylic acid allyl ester hydrochloride is crystallized, and is filtered off and washed with isopropanol. The 4,4'-diaminodiphenylmethane-3,3'-dicarboxylic acid allyl ester is then released from the hydrochloride by means of ammonia.

The carrier plates provided with the electrodes are coated by the roller coating method with a 12-% solution of the polyquinazoline dione prepolymer in N-methylpyrrolidone, which solution also contains, as an adhesion agent, 1% referred to the solid resin of vinyltriethoxy silane. The film coating so obtained is dried for 1 hour at about 90° C. and is subsequently annealed at about 300° C. and about 400° C. (½ hour at each temperature). Subsequently, rubbed layers which are highly orienting are generated on the surfaces of the polyquinazoline dione layers by rubbing with a brush in a definite direction. The coated carrier plates are then joined together at a temperature of about 470° C. by means of glass solder. After this thermal treatment, the liquid crystals of the displays are well oriented, i.e., the surface quality is not affected adversely.

EXAMPLE 3

For the preparation of very thin orientation layers one can proceed in such a manner that for coating the carrier plates a solution is used which contains a polymer compound in addition to the prepolymer.

Tests have shown, for example, that if a solution of 5 g of the polyisoindoloquinazoline dione prepolymer and of 3 g polymethylmethacrylate in 90 ml N-methylpyrrolindone is applied to a glass substrate by the roller coating method, a layer with a thickness of 0.12 μm is obtained after 2 hours of drying at 70° C. After annealing at 275° C., 330° C. and 420° C., for ½ hour at each temperature, a homogeneous film with a thickness of 0.03 μm is formed therefrom.

In the FIGURE, an embodiment of a display 10 according to the present invention is shown in a schematic side cross section, and specifically, a 7-segment liquid-crystal display. The display 10 has a front carrier plate 11 and a rear carrier plate 12. The two carrier plates are hermetically sealed in their edge zones by means of glass solder, a kind of frame 13 being formed. The liquid crystals 14 are located in the space between the carrier plates 11 and 12 separated by the frame 13. On the facing surfaces of the two carrier plates, electrodes or electrode layers 15 and 16 in the form of electrically conducting coatings are arranged. The front electrodes 15 as well as the free surface of the carrier plate 11 are coated with an orientation layer 17. An orientation layer 18 is provided on the back electrode 16. The orientation layers 17 and 18 consist of polyquinazoline dione or polyisoindoloquinazoline dione.

On the sides of the carrier plates 11 and 12 facing away from each other, a linear polarizer 19 and 20 is provided, the rear polarizer being arranged crosswise to the front polarizer. Finally, a reflector 21 is arranged at the rear linear polarizer 20. The liquid-crystal display 10 works according to the principle of the so-called twisted cell which is described in detail, for example, in German Auslegeschrift No. 21 58 563 and its corresponding British Pat. No. 1,372,868.

What is claimed is:

1. In a method for the preparation of orientation layers for liquid crystal displays wherein a solution of an organic prepolymer is applied to a transparent substrate and the prepolymer then annealed to form the desired polymer which is then subjected to rubbing as an orientation treatment, the improvement comprising utilizing as said prepolymer a prepolymer for a polyisoindoloquinazoline dione or a polyquinazoline dione, which prepolymer does not need to be radiation-sensitive, and which prepolymer produces a volatilizable side product when polymerized during annealing, the amount of said side product volatilized being a high weight percentage relative to the weight of the polymer.

2. The method according to claim 1 wherein the solution of said prepolymer further comprises a member selected from the group consisting of monomers, oligomers and polymers which are volatilized, at least in part, during the annealing.

3. The method according to claim 1 wherein the solution of said prepolymer further comprises a silane.

4. The method according to claim 1 wherein annealing is performed at a temperature greater than about 250 C.

5. In a liquid crystal display wherein liquid crystals are arranged in the space between opposed electrodes having orientation layers, on their inner, facing surfaces, said orientation layers being produced by a rubbing process the improvement wherein said orientation layers comprise polyquinazoline dione, said polyquinazoline dione being produced by polymerizing a prepolymer therefor, which prepolymer does not need to be radiation-sensitive, and which prepolymer produces a volatilizable side product when polymerized during annealing, the amount of said side product volatilized being a high weight percentage relative to the weight of the polymer.

6. The liquid crystal display according to claim 5 wherein said electrodes are affixed to carriers and wherein any exposed areas on the inner, facing surface of said carrier also contain said orientation layers.

7. The display according to claim 5 wherein the prepolymer is polymerized to the polymer at a temperature greater than about 250 C.

* * * * *